United States Patent
Kruglick et al.

(10) Patent No.: US 7,418,709 B2
(45) Date of Patent: *Aug. 26, 2008

(54) URL NAMESPACE TO SUPPORT MULTIPLE-PROTOCOL PROCESSING WITHIN WORKER PROCESSES

(75) Inventors: Emily Kruglick, Sammamish, WA (US); Geoffrey M. Kizer, Seattle, WA (US); Shai Kariv, Bellevue, WA (US); Lance E. Olson, Sammamish, WA (US); Erik B. Christensen, Seattle, WA (US); Kenneth D. Wolf, Seattle, WA (US); Dmitry Robsman, Bellevue, WA (US); Shanku Shivabrata Niyogi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

This patent is subject to a terminal disclaimer.

(21) Appl. No.: 10/931,349

(22) Filed: Aug. 31, 2004

(65) Prior Publication Data

US 2006/0080443 A1    Apr. 13, 2006

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/313; 719/314; 709/230

(58) Field of Classification Search ................. 719/330, 719/314, 313; 709/230
See application file for complete search history.

(56) References Cited

U.S. PATENT DOCUMENTS 5,146,593 A    9/1992    Brandle et al.

(Continued)

OTHER PUBLICATIONS

Reis, R. Q., "Dynamic Software Process Manager for the PROSOFT Software Engineering Environment", SoST98' : Symposium on Software Technology Process Improvement: Putting Software Environment to Work, pp. 197-202, Sep. 1998.

(Continued)

*Primary Examiner*—Meng-Ai An
*Assistant Examiner*—KimbleAnn Verdi
(74) *Attorney, Agent, or Firm*—Lee & Hayes, PLLC (57) ABSTRACT

A server system in typical operation has a process manager, multiple listeners (each to receive requests for its protocols) and multiple worker processes that are each able to handle requests in multiple protocols. At server start-up, each listener connects with the process manager via a pipe published by the process manager. The listener then receives information via the process manager that includes information defining the application(s) for which that listener is to "listen" and associating application(s) to application pool(s). When the listener receives a request for such an application, the listener starts a queue for the associated application pool. The listener may use a hierarchical matching scheme to determine the associated application or application pool from the requested application. The process manager launches an appropriate worker process to handle requests in the listener's protocol. The worker process then makes a connection with the listener.

15 Claims, 8 Drawing Sheets

U.S. PATENT DOCUMENTS

| | | | |
|---|---|---|---|
| 5,155,837 A | 10/1992 | Liu et al. | |
| 5,535,322 A | 7/1996 | Hecht | |
| 5,590,266 A | 12/1996 | Carson et al. | |
| 5,706,507 A | 1/1998 | Schloss | |
| 5,715,386 A | 2/1998 | Fulton, III et al. | |
| 5,845,280 A | 12/1998 | Treadwell, III et al. | |
| 5,878,408 A | 3/1999 | Van Huben et al. | |
| 5,918,226 A | 6/1999 | Tarumi et al. | |
| 5,920,867 A | 7/1999 | Van Huben et al. | |
| 5,920,873 A | 7/1999 | Van Huben et al. | |
| 5,928,323 A | 7/1999 | Gosling et al. | |
| 5,930,830 A | 7/1999 | Mendelson et al. | |
| 6,023,702 A | 2/2000 | Leisten et al. | |
| 6,067,580 A * | 5/2000 | Aman et al. | 719/330 |
| 6,094,654 A | 7/2000 | Van Huben et al. | |
| 6,098,064 A | 8/2000 | Pirolli et al. | |
| 6,112,196 A * | 8/2000 | Zimowski et al. | 707/2 |
| 6,157,959 A | 12/2000 | Bonham et al. | |
| 6,188,698 B1 | 2/2001 | Galand et al. | |
| 6,209,018 B1 * | 3/2001 | Ben-Shachar et al. | 718/105 |
| 6,212,573 B1 * | 4/2001 | Lim et al. | 719/315 |
| 6,219,760 B1 | 4/2001 | McMinn | |
| 6,223,202 B1 | 4/2001 | Bayeh | |
| 6,223,207 B1 | 4/2001 | Lucovsky et al. | |
| 6,289,458 B1 | 9/2001 | Garg et al. | |
| 6,327,594 B1 | 12/2001 | Van Huben et al. | |
| 6,339,771 B1 * | 1/2002 | Zimowski et al. | 707/2 |
| 6,389,421 B1 | 5/2002 | Hawkins et al. | |
| 6,463,465 B1 | 10/2002 | Nieuwejaar | |
| 6,542,920 B1 * | 4/2003 | Belkin et al. | 718/104 |
| 6,574,712 B1 | 6/2003 | Kahle et al. | |
| 6,594,784 B1 | 7/2003 | Harper et al. | |
| 6,604,106 B1 | 8/2003 | Bodin et al. | |
| 6,622,168 B1 | 9/2003 | Datta | |
| 6,629,266 B1 | 9/2003 | Harper et al. | |
| 6,636,900 B2 * | 10/2003 | Abdelnur | 719/316 |
| 6,671,716 B1 * | 12/2003 | Diedrichsen et al. | 709/203 |
| 6,732,138 B1 | 5/2004 | Browning et al. | |
| 6,792,611 B2 | 9/2004 | Honishi et al. | |
| 6,810,495 B2 | 10/2004 | Castelli et al. | |
| 6,820,215 B2 | 11/2004 | Harper et al. | |
| 6,915,384 B2 | 7/2005 | Mitra et al. | |
| 6,941,379 B1 * | 9/2005 | Dingsor et al. | 709/235 |
| 6,978,398 B2 | 12/2005 | Harper et al. | |
| 6,990,513 B2 | 1/2006 | Belfiore et al. | |
| 7,028,091 B1 | 4/2006 | Tripathi et al. | |
| 7,028,312 B1 * | 4/2006 | Merrick et al. | 719/330 |
| 7,107,329 B1 * | 9/2006 | Schroder et al. | 709/221 |
| 7,257,819 B1 * | 8/2007 | Dixon et al. | 719/316 |
| 7,330,483 B1 * | 2/2008 | Peters et al. | 370/466 |
| 7,356,803 B2 * | 4/2008 | Bau et al. | 717/116 |
| 2001/0010053 A1 * | 7/2001 | Ben-Shachar et al. | 709/105 |
| 2002/0047899 A1 | 4/2002 | Son et al. | |
| 2002/0059425 A1 * | 5/2002 | Belfiore et al. | 709/226 |
| 2002/0062372 A1 | 5/2002 | Hong et al. | |
| 2002/0065900 A1 * | 5/2002 | Dor et al. | 709/217 |
| 2002/0069420 A1 | 6/2002 | Russell et al. | |
| 2002/0073132 A1 * | 6/2002 | Van Garderen et al. | 709/102 |
| 2002/0078174 A1 | 6/2002 | Sim et al. | |
| 2002/0083214 A1 * | 6/2002 | Heisig et al. | 709/315 |
| 2002/0087612 A1 | 7/2002 | Harper et al. | |
| 2002/0087797 A1 | 7/2002 | Adrangi | |
| 2002/0120710 A1 | 8/2002 | Chintalapati et al. | |
| 2002/0129123 A1 | 9/2002 | Johnson et al. | |
| 2002/0147823 A1 * | 10/2002 | Healy | 709/230 |
| 2002/0147966 A1 | 10/2002 | Frazier | |
| 2002/0152328 A1 | 10/2002 | Kagan et al. | |
| 2002/0161908 A1 | 10/2002 | Benitez et al. | |
| 2003/0005122 A1 | 1/2003 | Freimuth et al. | |
| 2003/0005181 A1 * | 1/2003 | Bau et al. | 709/330 |
| 2003/0023957 A1 * | 1/2003 | Bau et al. | 717/140 |
| 2003/0061378 A1 | 3/2003 | Mazzitelli | |
| 2003/0079154 A1 | 4/2003 | Park et al. | |
| 2003/0084018 A1 * | 5/2003 | Chintalapati et al. | 707/1 |
| 2003/0135464 A1 | 7/2003 | Mourad et al. | |
| 2003/0135542 A1 * | 7/2003 | Boudreau | 709/203 |
| 2003/0182400 A1 * | 9/2003 | Karagounis et al. | 709/219 |
| 2004/0068479 A1 * | 4/2004 | Wolfson et al. | 707/1 |
| 2004/0205048 A1 * | 10/2004 | Pizzo et al. | 707/3 |
| 2004/0205769 A1 * | 10/2004 | Ruutu | 719/313 |
| 2005/0021689 A1 * | 1/2005 | Marvin et al. | 709/220 |
| 2005/0235290 A1 * | 10/2005 | Jefferson et al. | 719/310 |
| 2005/0246415 A1 | 11/2005 | Belfiore et al. | |
| 2007/0078995 A1 * | 4/2007 | Benard et al. | 709/230 |
| 2007/0199001 A1 * | 8/2007 | Grasso | 719/330 |
| 2007/0204279 A1 * | 8/2007 | Warshavsky et al. | 719/330 |

OTHER PUBLICATIONS

Hunt, G.D.H., "Network Dispatcher: A Connection Router for Scalable Internet Services", Computer Networks and ISDN Systems Conference Title: Comput. Netw. ISDN Syst., vol. 30, No. 1-7, pp. 347-357, Apr. 1998.

Saslgarelli, L., "Supporting IP Multicast Integrated Services in ATM Networks", Broadband Networking Technologies, pp. 78-88, Nov. 1997.

Donnelly, P., "Writing IIS Applications in Dyalog APL", APL Quote Quad, vol. 33, No. 1, pp. 13-17, Sep. 1990.

Alexandrov, I et al., "Process Management Inside Atlas DAQ", IEEE Transactions on Nuclear Science, vol. 49, No. 5, pp. 2459-2462, Oct. 2002.

Fitzpatrick, M., "The IRAF Client Display Library (CDL)", vol. 145, pp. 200-203, Astronomical Society of the Pacific Conference Series Conference, Sep. 1997.

Canosa, M., "Extensions to the MARS Model for IP Integrated Services over ATM Networks", Internet Routing and Quality of Service, pp. 132-142, Nov. 1998.

Shim, Jae-Hong, "Mike: Real-Time Microkernel Supporting Monitor Concept", Hanguk Chongbo Kwahakhoe Chi = Journal of the Korean Information Science, vol. 25, No. 2, pp. 166-176, Feb. 1998.

Chen, Q, "How Agents from Different E-Commerce Enterprises Cooperate", Proceedings 5th International Symposiumo n Autonomous Decentralized Systems, pp. 341-348, Mar. 2001.

Tanaka, M., "A File Service Mechanism for Distributed Systems", Quarterly Reports Railway Technical Research Institute, vol. 31, No. 3, pp. 160-164, Sep. 1990.

Caucho Servlet Engine on Apache Unix, Mar. 12, 2008 at <<http://web.archive.org/web/2001040144529/caucho.com/products/resin/ref/cs3-apache-unix.xtp>>, Caucho, 1998-2001, pp. 1-6.

Li et al., "An Approach for Estimation of Software Aging in a Web Server", IEEE, Proceedings of the 2002 International Symposium on Empirical Software Engineering, 2002, 10 pgs.

Mercer et al., "Processor Capacity Reserves: An Abstraction for Managing Processor Usage", Workstation Operating System, 1993. Proceedings. Fourth Workshop on Oct. 14-15, 1993, pp. 129-134.

Tanenbaum, "Structured Computer Organization", Prentice-Hall Inc, 1984, pp. 10-12.

"Web Application: Servlets and Filters" retrieved at <<http://www.caucho.com/resin-3.0/config/webapp.xtp>> on Mar. 12, 2008, Caucho Technologies Inc, 21 pgs.

Zhou et al., "Processor Pool-Based Scheduling for Large-Scale NUMA Multiprocessors", Joint International Conference on Measurement and Modeling of Computer Systems, ACM, 1991, pp. 133-142.

* cited by examiner

```
                                                                    ┌─600
< site   name="site 1" >
        < bindings >
                < add  protocol = "http"   bindinginfo = "www.msn.com" />
                < add  protocol = "https"  bindinginfo = "www.msn.com" />
                < add  protocol = "http"   bindinginfo = "www.xyz.com" />
                < add  protocol = "soap.tcp" bindinginfo = "*:90" />
        < /bindings >
        < apps >
                < add  path = "/"     apppool = "AppPool1" />
                < add  path = "/foo"  apppool = "AppPool2" />
                < add  path = "/bar"  apppool = "AppPool3"  enabledProtocols = "soap.tcp" />
        < /apps >
< /site >
```

*FIG. 6A*

Application: "/"
   http:  www.msn.com/
   http:  www.xyz.com/ } AppPool1   *FIG. 6B*
   https: www.msn.com/
   soap.tcp: "*:90"/

Application: "/foo"
   http:  www.msn.com/foo
   http:  www.xyz.com/foo } AppPool2   *FIG. 6C*
   https: www.msn.com/foo
   soap.tcp: "*:90"/foo Application: "/bar"
   http:  www.msn.com/bar Ø
   http:  www.xyz.com/bar Ø } AppPool3   *FIG. 6D*
   https: www.msn.com/bar Ø
   soap.tcp: "*:90"/bar

URL NAMESPACE TO SUPPORT MULTIPLE-PROTOCOL PROCESSING WITHIN WORKER PROCESSES

CROSS-REFERENCE TO RELATED APPLICATIONS

This application is related to co-filed and commonly assigned U.S. patent application Ser. No. 10/931,600 entitled "Method And System To Support A Unified Process Model For Handling Messages Sent In Different Protocols" and to co-filed and commonly assigned U.S. patent application Ser. No. 10/931,437 entitled "Method And System To Support Multiple-Protocol Processing Within Worker Processes."

This application is also related to co-pending and commonly assigned U.S. patent application Ser. No. 09/878,950 entitled "Methods and Arrangements for Routing Server Requests to Worker Processes Based on URL" filed on Jun. 11, 2001; U.S. patent application Ser. No. 10/377,175 entitled "An Improved Web Server Architecture" filed Feb. 28, 2003; U.S. patent application Ser. No. 10/377,148 entitled "Ensuring the Health and Availability of Web Applications" filed Feb. 28, 2003; and U.S. patent application Ser. No. 10/377,176 entitled "Web Garden Application Pools Having a Plurality of User-Mode Web Applications" filed Feb. 28, 2003.

FIELD

Various embodiments described below relate generally to computers and like devices, and more particularly but not exclusively to servers. Still more particularly, various embodiments relate to connections to worker processes running on servers.

BACKGROUND

The popularity of the Internet, and in particular, the portion of the Internet known as the World Wide Web, continues to grow. The World Wide Web is basically a collection of computers that are operatively linked together through a plurality of communication networks. Typically, users access the World Wide Web through a personal computer or like device, which is connected to the Internet via a modem of some type. For example, many users of the World Wide Web connect to the Internet using a dial-up telephone networked modem configured to establish data communications through an Internet Services Provider (ISP). Other users connect to the Internet with a faster modem, e.g., a cable modem, digital subscriber line (DSL) modem, etc.

Regardless of how a user ultimately connects to the Internet/World Wide Web, once connected the user typically accesses information available therein by using a web browser or like application. A web browser is configured to access web pages that are provided through the Internet by other computers. For example, one or more web server computers may be connected to the Internet and configured with one or more web sites or other supporting web applications. A web site typically has one or more static web pages and/or is capable of supplying one or more dynamically generated web pages that the user may selectively download, view and possible interact with.

To identify a particular web site/page the user will typically select a hyper link to the desired web site/page or may choose to manually enter a unique name for the web site/page. The most common name used for identifying a web site/page is known as the uniform resource locator (URL). For example, by entering a URL, the user will be connected to an appropriate web server which hosts the applicable web application(s), and the requested web page will be downloaded using a hypertext transfer protocol (HTTP) to the web browser. Within the Internet itself, the selected URL is associated with a specific Internet Protocol (IP) address. This IP address takes the form of a unique numerical identifier, which has been assigned to the targeted web server. Thus, a user may also directly enter an IP address in the web browser. However, the majority of users tend to favor the use of the more easily remembered and entered URL.

When a typical web server receives a request, e.g., an HTTP request, from a web browser, it needs to handle the request. Hence, a web server process may be configured to handle the request itself, or may need to pass the request on to another process, e.g., a worker process, that is configured to handle the request. Conventional web server processes typically listen to a particular port (e.g., "port 80") provided by a Transmission Control Protocol/Internet Protocol (TCP/IP) kernel-mode provided service. When a request is received, the web server process either handles the request or calls for a worker process to handle the request. To determine which worker process should handle the request, most conventional web server processes either map the request to a physical file or to a dynamic application of some sort, such as a dynamic-linked library (DLL) or common gateway interface (CGI) process. Mapping is typically based on the extension provided at the end of the URL. For example, an ".html" extension signifies that the desired web page is in a HyperText Markup Language format. This extension could then be found, for example, in a look-up table, and associated with a specific worker process, if needed. Conversely, the .html extension may identify that the web server process can handle the request itself. There exists a plurality of extensions that may be used to identify the applicable worker process.

Once a specific worker process has been identified, the worker process is started (as needed) and the request is forwarded to the worker process. Such decisions and subsequent routing of the request are conducted by user-mode processes.

Conventional web servers typically incur a delay associated with such user-mode "process hops". For such web servers, which often receive thousands of requests each minute, the delays associated with process hops can diminish the efficiency of the web server. In certain configurations, the web server process may be required to share a common communication port with one or more worker processes. This too may further reduce the efficiency of the web server. In addition, there can be a reduction in the robustness of the web server in certain situations, e.g., when a worker process fails to receive/complete the request, etc.

SUMMARY

According to aspects of the various embodiments, methods and systems are provided for connecting listeners with worker processes to handle requests in multiple protocols. A system includes a server having a process manager, one or more worker processes and one or more listeners. The system also includes multiple clients that request services from the server. The clients can send requests in different protocols, and the server includes at least one listener to process each supported protocol. In one aspect, each listener receives requests in its protocol, with different listeners processing different protocols so that multiple protocols are supported.

In an initialization operation, each listener receives endpoint information that the listener uses to process received requests. The endpoint information includes notification of which application(s) that the listener is to listen for in requests received from clients. The endpoint information also includes associations (e.g., mappings) between applications and application pools. When the listener receives a request for an application for which it is listening, the listener obtains an identifier of the application pool associated with the requested application and provides this identifier to the process manager to be used in launching a worker process for the application pool.

In another aspect, the listener compares a path portion of the request to identifiers of the applications referenced in the endpoint information. In a further refinement, in comparing the path portion to the application identifiers, the listener searches for the longest hierarchical match between the path portion and the application identifiers in the endpoint information.

In still another aspect, the endpoint information to enable applications and/or application pools. Further, the endpoint information can be updated to disable one or more applications and/or application pools that were enabled.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

The following techniques and mechanisms are directed to implementing methods and systems for establishing connections between listeners and worker processes to support handling of requests in different protocols. Generally stated, a service (e.g., a listener) connects with a process manager via a pipe published by the process manager. When the listener receives a request, it starts an internal queue corresponding to that request and signals (e.g., send a message or make a call) the process manager to launch a worker process to handle the request. In signaling the process manager, the listener effectively indicates the protocol of the request. For example, in one embodiment, each listener has registered the protocol it handles with the process manager during an installation process and, thus, inherently indicates the request's protocol when it sends the message to the process manager. The process manager launches the worker process with an appropriate protocol handler so that the worker process can correctly handle the requests. The worker process then makes a connection with the listener and pulls requests from the listener's internal queue. Specific implementations of this general concept are described below.

General Overview of System

Figure 1:
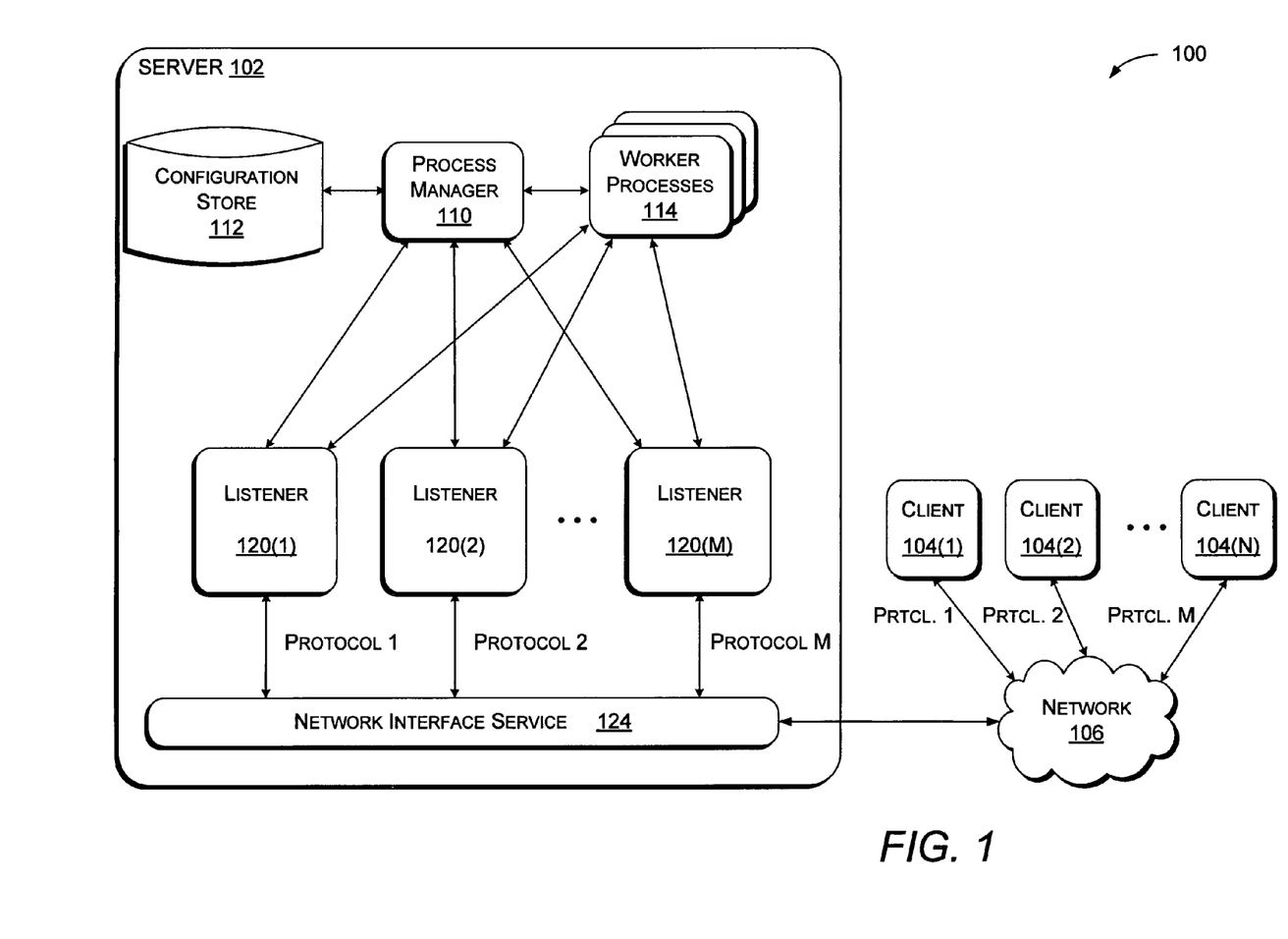
FIG. 1 is a functional block diagram illustrating a client-server system having listeners supporting multiple protocols, according to one embodiment.

FIG. 1 illustrates a client-server system 100 having multiple listeners that each support processing of requests in a specified protocol, according to one embodiment. In this embodiment, system 100 includes a server 102, clients 104(1)-104(N), and a network 106 over which server 102 and clients 104(1)-104(N) communicate. Further, during typical operation, server 102 includes a process manager 110, a configuration store 112, worker processes 114 and listeners 120(1)-120(M) in this embodiment. In some embodiments, each listener includes a listener adapter (not shown) and a listener component (not shown). In other embodiments, the listener adapter and the listener component are separate components and can be in separate processes. For each listener, the listener adapter exchanges information with process manager 110 and configures the listener component based on information received from process manager 110. Server 102, in this embodiment, also includes a network interface service 124. In one embodiment, network interface service 124 is implemented as a TCP/IP kernel mode service.

In addition to describing methods and systems to establish connections between listeners and worker processes to support requests in multiple protocols, the general operation of system 100 is described below to facilitate understanding of the operation of the various embodiments.

In this exemplary embodiment, system 100 is used to service requests in various protocols sent by clients 104(1)-104(N) via network 106 for web services provided by server 102. In some embodiments, listeners 120(1)-120(M) and worker processes 114 are implemented as disclosed in the aforementioned co-filed and commonly assigned U.S. patent application Ser. Nos. 10/931,349 and 10/931,600, although in other embodiments these components may be implemented differently. Each of these elements is generally described below.

Configuration store 112 is used to store information about the configuration of server 102 to allow for associations to be made between applications (which can include sites/pages/services provided by server 102) and application pools. For example, configuration store 112 may define multiple application pools (as previously mentioned, an application pool is a collection of applications that all route to the same set of worker processes). In one embodiment, process manager 110 uses information in configuration store 112 to configure listeners 120(1)-120(M) to listen for application URIs and identify appropriate application pools for servicing the requests based on the application URIs. Configuration store 112 may be updated by an administrator.

Process manager 110 generally operates to configure listeners 120(1)-120(M), and to launch and manage worker processes 114 in response to requests received by listeners 120(1)-120(M) from clients 104(1)-104(N). For example, process manager 110 can configure listeners 120(1)-120(M) using information from configuration store 112. In other embodiments, process manager 110 may configure listeners using information obtained in other ways.

Listeners, after being configured by process manager 110, operate to receive service requests from clients 104(1)-104

(N) and support communication between the clients and worker processes 114. For example, in one embodiment, a listener examines a received request to identify an appropriate application pool, as described in the aforementioned U.S. patent application Ser. Nos. 10/931,600 and 10/931,437. Each listener supports a specific protocol so that together, the listeners support handling of requests in multiple protocols.

Worker processes 114 handle requests, which can originate from clients in multiple protocols. As previously described, worker processes 114 are launched by process manager 110 in response to requests received by listeners 120(1)-120(M). Inside worker processes 114, protocol handlers are loaded to connect with listeners 120(1)-120(M) to route requests to the appropriate application in the worker process for servicing. A worker process can support more than one protocol. In this embodiment, each of the worker processes is supported by a private (non-shared) interface with a listener.

Network interface service 124 provides services to support communication over network 106. In a typical embodiment, network interface service 124 provides support for TCP/IP communication over network 106. In other embodiments in which network 106 uses a different protocol, network interface service 124 would be configured to provide support for this other protocol.

Figure 2:
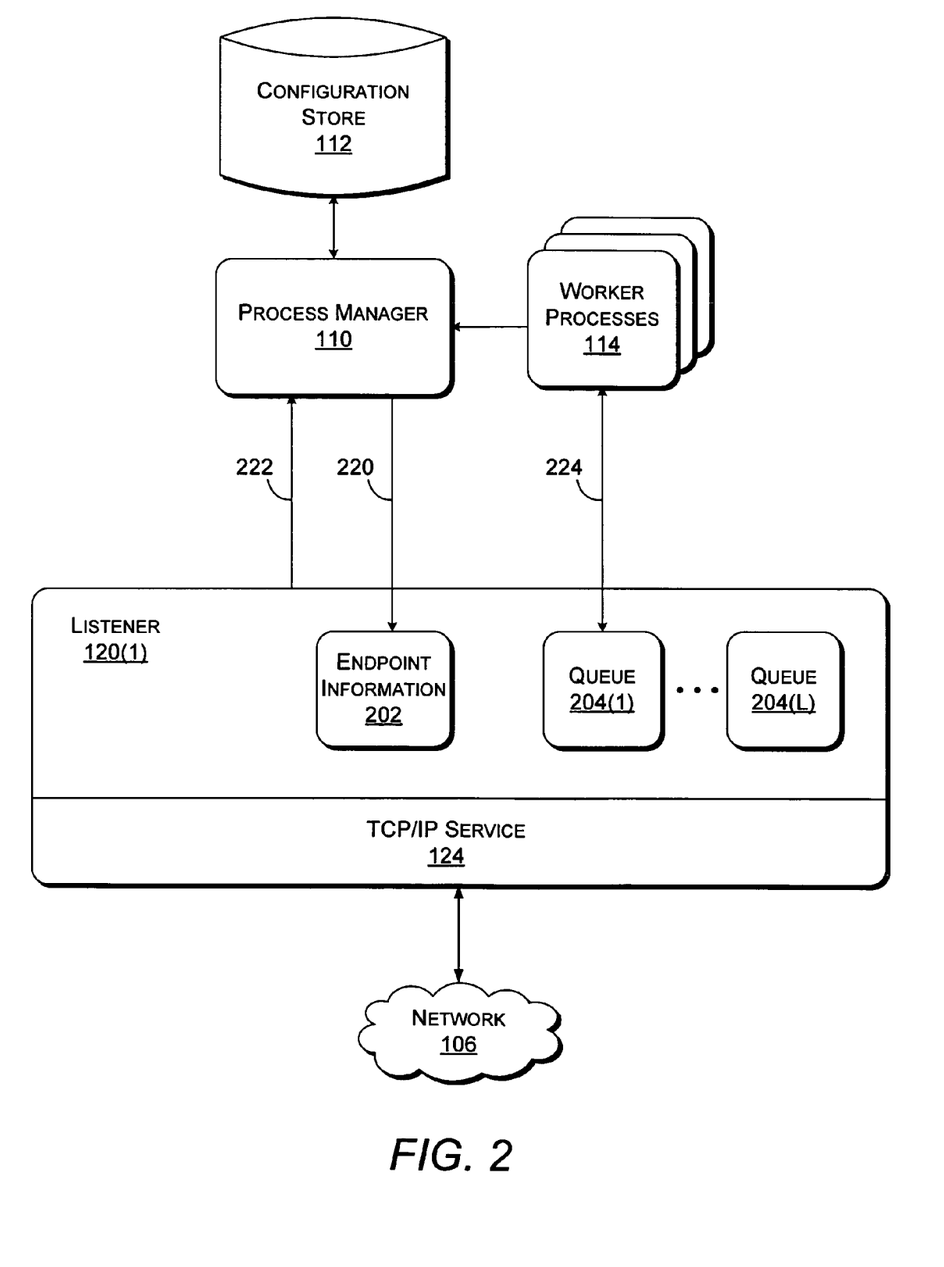
FIG. 2 is a functional block diagram illustrating a single listener in more detail, according to one embodiment.

FIG. 2 illustrates an embodiment of listener 120(1) in more detail, which can also apply to listeners 120(2)-120(M). This embodiment of listener 120(1) includes endpoint information 202, and queues 204(1)-204(L). In addition, network interface service 124 (FIG. 1) is implemented as a TCP/IP service in this embodiment.

In this embodiment, endpoint information 202 is obtained from configuration store 112 via process manager 110 as indicated by an arrow 220. As previously described, endpoint information 202 can include information for configuring listener 120(1) to listen for one or more particular applications when receiving requests. In addition, endpoint information 202 can include information for associating detected applications to appropriate application pools. For example, one such association may map multiple applications (also referred to herein as a binding) to a particular application pool.

Queues 204(1)-204(L) are created by listener 120(1) in response to requests received from clients (see FIG. 1) via network 106. For example, after receiving a request, listener 120(1) can identify an application pool associated with an application in the request using endpoint information 202 and then create a new queue for the identified application pool. The listener can then route the request to this internal queue.

Listener 120(1) may also route received requests to existing queues. For example, if listener 120(1) receives a request that references an application that is mapped to an application pool for which a queue has already been created, then listener 120(1) will route that request to that existing queue.

Figure 3:
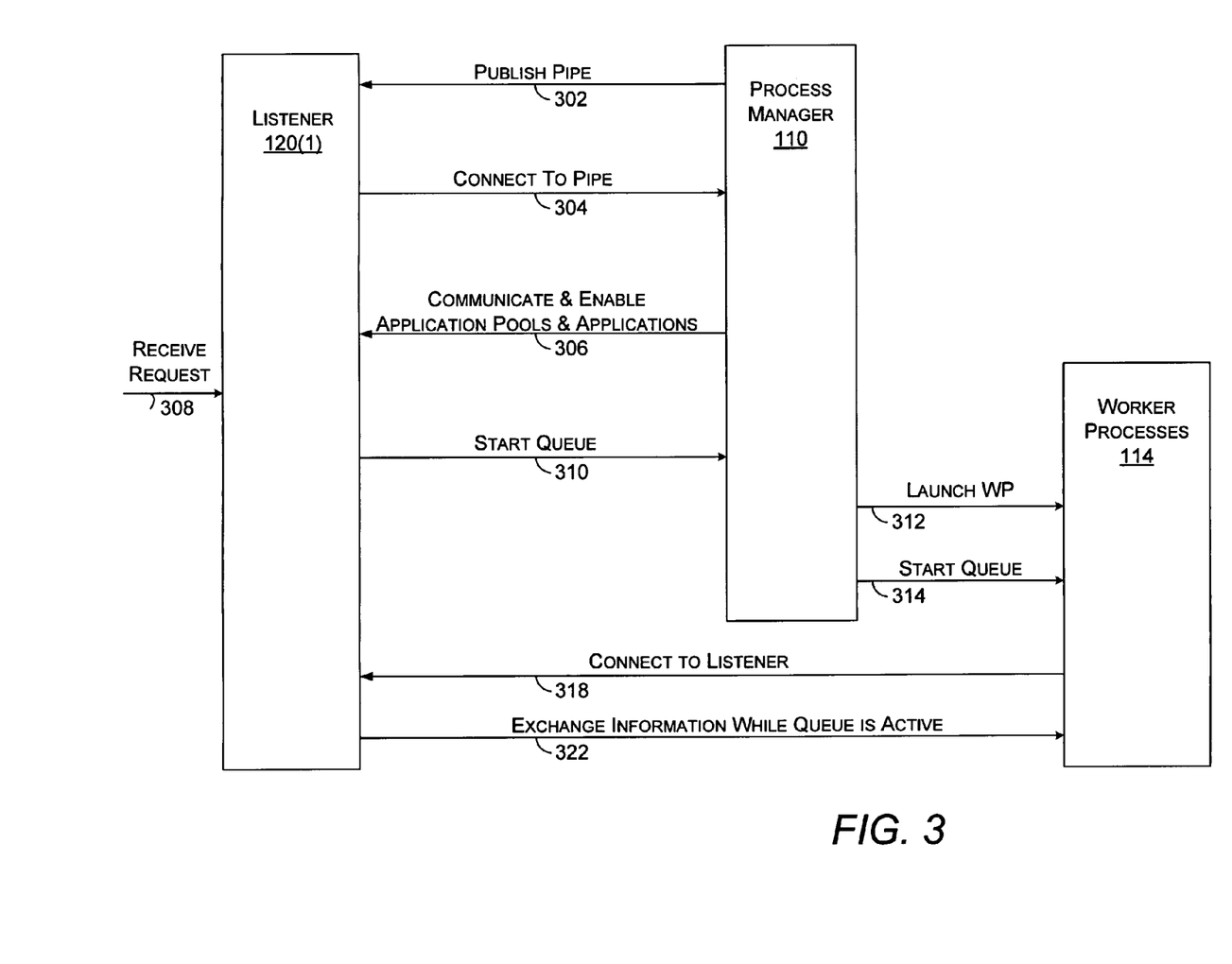
FIG. 3 is a diagram generally illustrating sequence of events in establishing and using a connection between a listener and a worker process, according to one embodiment.

FIG. 3 illustrates a sequence of operations that occur in establishing and using a connection between listener 120(1) and one of worker processes 114 to handle a request received in one of the supported multiple protocols, according to one embodiment. This sequence can also apply to listeners 120 (2)-120(M). Referring to FIGS. 2 and 3, a connection is established between listener 120(1) and one of worker processes 114 according to one embodiment as follows.

At an initialization phase of server 102 (FIG. 1), process manager 110 publishes a pipe so that all listeners (that have not yet connected to such a pipe) can attempt to connect to the pipe. In this example, listener 120(1) is the first to detect the published pipe. This operation is represented by an arrow 302 in FIG. 3. As previously described, each listener supports a particular protocol, so that together listeners 120(1)-120(M) support client-server communication in multiple protocols.

In response, listener 120(1) connects to the pipe. This pipe connection is indicated by an arrow 220 in FIG. 2. Other listeners that have not yet connected to a pipe that was published by process manager 110 then have to wait for process manager 110 to publish the next pipe and attempt to connect. This operation is represented by an arrow 304 in FIG. 3.

Once listener 120(1) is connected to the pipe, process manager 110 provides endpoint information 202 to listener 120(1). This operation is represented by an arrow 306 in FIG. 3. As previously described, this information identifies the application(s) that listener 120(1) is to listen for when receiving requests. This information also creates and enables associations between applications and application pools that allow listener 120(1) to identify an appropriate application pool for an application requested in a received request.

Listener 120(1) then "listens" for requests for which it can identify an application and an association of the application with an application pool. If the requested application is associated with an application pool for which listener 120(1) has already created a queue, then the request can be placed in that queue. On the other hand, if the request's application is associated with an application pool for which listener 120(1) has not yet created a queue, then the request can be categorized as one that "needs a new queue".

When listener 120(1) receives a request that needs a new queue (indicated by an arrow 308 in FIG. 3), listener 120(1) then starts a new internal queue such as queue 204(1), for example. In this embodiment, listener adapter 122(1) also signals process manager 110 to start a new queue in a worker process, as indicated by arrow 222 in FIG. 2. As previously described for one embodiment, the protocol of the request is "automatically" indicated by the listener in that each listener supports a particular protocol and has registered this protocol with process manager 110. Thus, process manager 110 knows the protocol of the request by the identity of the listener that starts the queue. This operation is represented by an arrow 310 in FIG. 3.

Process manager 110, in response to listener 120(1) starting a queue, launches a worker process (i.e., one of worker processes 114) corresponding to the application pool associated with the requested application. The worker process can include one or more applications. This operation is represented by an arrow 312 in FIG. 3.

After launching the worker process, process manager 110 in this embodiment also causes the worker process to start a queue for received requests and, in some scenarios, messages to be sent to listener 120(1) in handling the request. This operation is represented by an arrow 314 in FIG. 3. In some scenarios, a worker process may have more than one queue.

In this embodiment, the worker process launched in operation 314 also includes a protocol handler for each protocol needed to support the queue(s) started in that worker process. In one embodiment, starting the queue in the worker process causes the worker process to load a protocol handler corresponding to the protocol supported by listener 120(1).

With the protocol handler loaded, a connection between the worker process and listener 120(1) is established as indicated by an arrow or connection 224 in FIG. 2. As described below, requests in the protocol accepted by listener 120(1) can be routed to and handled by the worker process via connection 224. This operation of forming connection 224 is represented by an arrow 318 in FIG. 3.

In some embodiments, process manager 110 can configure listener 120(1) to request a start of a new queue when process manager 110 determines a new instance of a queue is needed or desirable (e.g., as part of a recycling operation to improve stability).

Listener 120(1) and the worker process can then exchange information. For example, listener 120(1) routes requests to the worker process via connection 224 (FIG. 2). In addition, information may also flow over connection 224 from the worker process to the client via listener 120(1). This operation is represented by an arrow 322 in FIG. 3. With listeners 120(2)-120(M) (see FIG. 1) configured to receive requests in other protocols, system 100 (FIG. 1) can advantageously service requests in multiple protocols.

Although a particular sequence of operations is describe above, in other embodiments the operations may be performed in other sequences, with some operations being performed multiple times, in different orders, and/or concurrently with other operations.

Exemplary Operational Flow of a Listener

Figure 4:
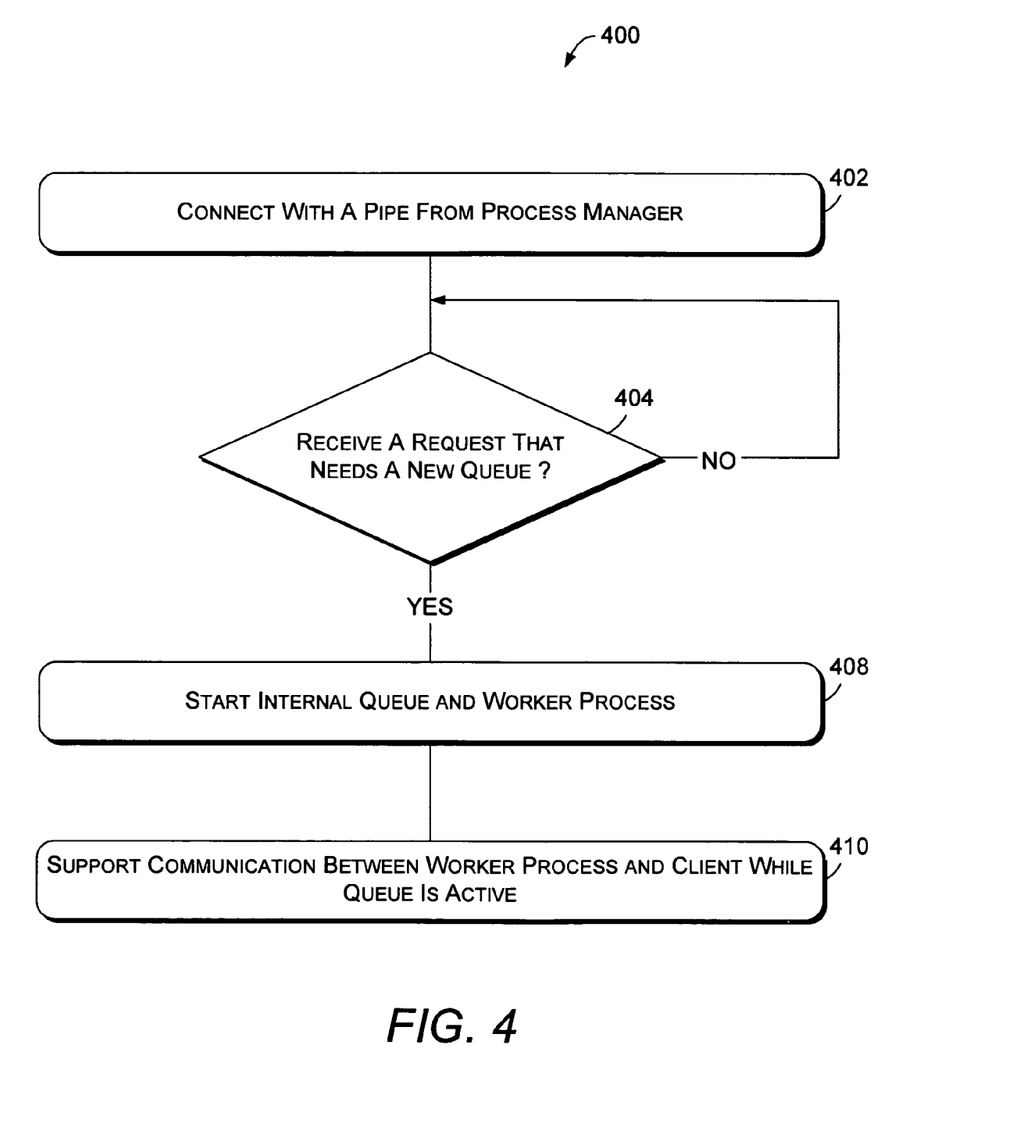
FIG. 4 is a flow diagram generally illustrating operational flow of a particular listener in establishing a connection with a worker process, according to one embodiment.

FIG. 4 is a flow diagram generally illustrating a process 400 by which a listener can establish a connection with a worker process, according to one embodiment. For example, in one embodiment, process 400 can be performed by listener 120(1) as depicted in FIG. 2; however, different listener implementations can be used to perform the process in other embodiments. As previously mentioned, each listener will have already registered with the process manager, declaring the protocol it supports.

At a block 402, a listener connects to a pipe published by a process manager. In one embodiment, for example, the listener is implemented as in listener 120(1) (FIG. 2) and, thus, the listener can connect to the published pipe as described above for operation 304 (FIG. 3). This connection can be used by the process manager to configure the listener. One embodiment of block 402 is described in more detail below in conjunction with FIG. 5.

At a block 404, after being configured, the listener waits to receive a request that requires a new queue. Continuing the above example in which the listener is implemented like listener 120(1), the listener can determine whether a received request needs a queue by determining whether it already has a queue for the application pool associated with the application requested by the request. If such a queue already exists, the listener routes the request to that queue, and the operational flow returns to the beginning of block 404 to await another request. On the other hand, if the listener receives a request for an application that is associated with an application pool for which the listener does not have a queue, the operational flow proceeds to a block 408.

At block 408, the listener creates a queue in the listener (also referred to herein as an internal queue). Continuing the above example, the listener can create the internal queue as described above for operation 310 (FIG. 3). In addition, the listener signals the process manager to start the worker process appropriate for the application pool associated with the request's application. One embodiment of block 408 is described in more detail in conjunction with FIG. 6.

At a block 410, the listener supports transfer of information between the worker process and the client. Continuing the above example, the listener can support this communication as described above for operation 322 (FIG. 3). In this way, the process manager need not be involved in the normal handling of the request. However, in some embodiments, the process manager may monitor this communication and start recovery operations if an error in the request handling should occur.

Although process 400 is illustrated and described sequentially, in other embodiments, the operations described in the blocks may be performed in different orders, multiple times, and/or in parallel.

Figure 5:
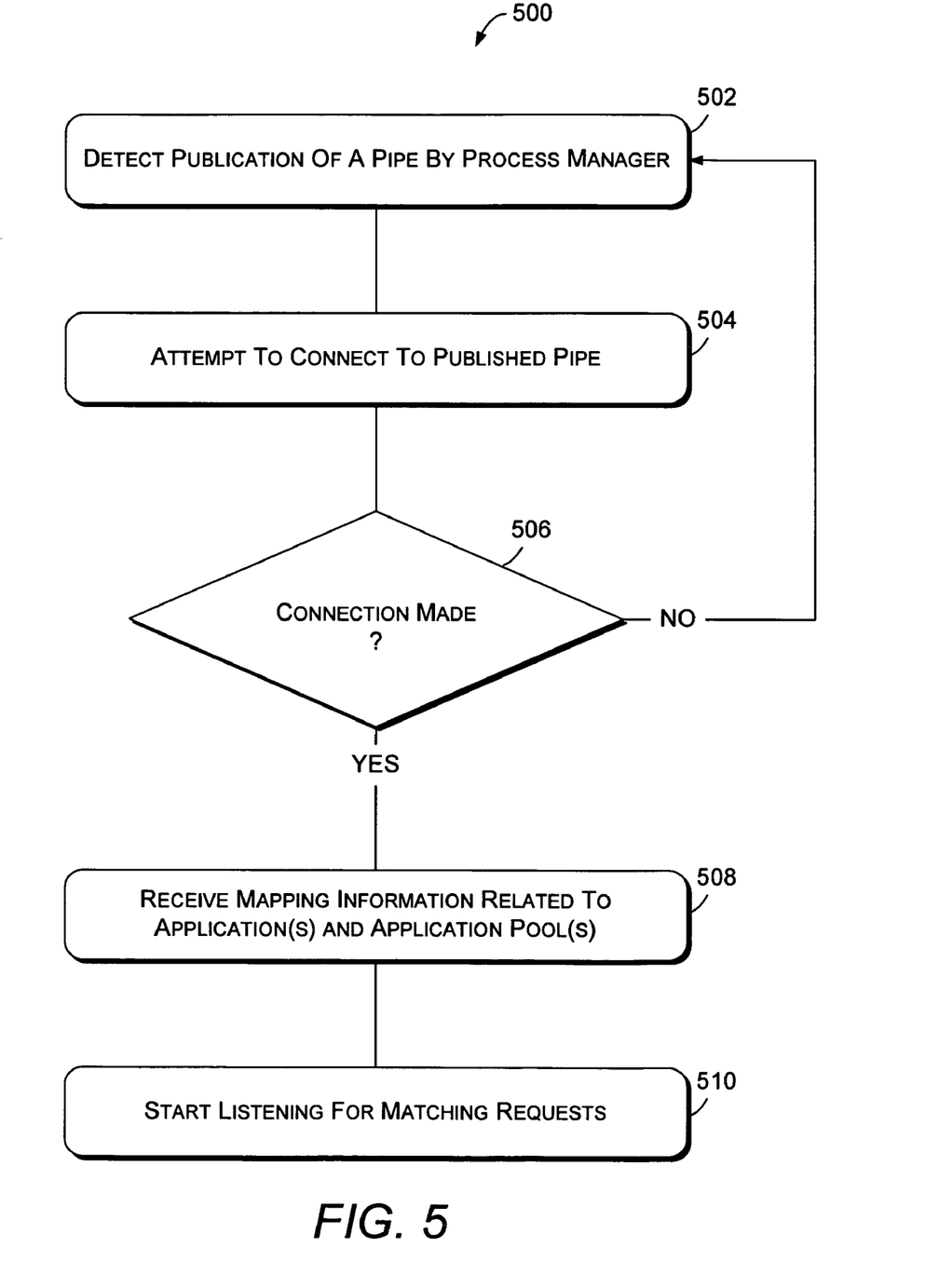
FIG. 5 is a flow diagram generally illustrating a process by which a listener can connect to a process manager, according to one embodiment.

FIG. 5 is a flow diagram generally illustrating a process 500 by which a listener can connect to a process manager, according to one embodiment. This process can be used to implement block 402 of process 400 (FIG. 4). For example, in one embodiment, the process to connect to a process manager can be performed by listener 120(1) as depicted in FIG. 2; however, different listener implementations can be used to perform the process in other embodiments.

At a block 502, the listener detects publication of a pipe by the process manager. During start-up of the server, the process manager would publish a pipe to connect with one of the multiple listeners. All of the listeners that have not connected with the process manager during the start-up phase would attempt to connect with the pipe.

At a block 504, the listener attempts to connect to the published pipe. In one embodiment, the first listener to attempt to connect will make the connection. In this embodiment, other attempts to connect to this published pipe will be rejected or ignored.

At a block 506, if the listener does not connect to the published pipe at block 504, the operational flow loops back to block 502. This looping continues until the listener does connect to a pipe published by the process manager. However, if the listener does connect to a published pipe, the operational flow of process 500 proceeds to a block 508.

At a block 508, the listener receives information related to applications and application pools. As previously described, this information can include associations or mappings between applications and application pools. In addition, the information can identify the application(s) in received requests for which the listener is to listen.

At a block 510, the listener then begins listening for requests for matching application(s). For example, in one embodiment, TCP/IP service 124 (FIG. 2) routes requests to the listeners so that the protocol of the request is the same as the protocol of the listener. When a listener receives a request in this embodiment, the listener determines from the information received in block 508 whether the requested application has been mapped to an application pool. If not, the listener can ignore the request, send an error message, etc. If the request's application has been mapped to an application pool, the process can proceed to block 404 (FIG. 4).

Although process 500 is illustrated and described sequentially, in other embodiments, the operations described in the blocks may be performed in different orders, multiple times, and/or in parallel.

Figure 6A:
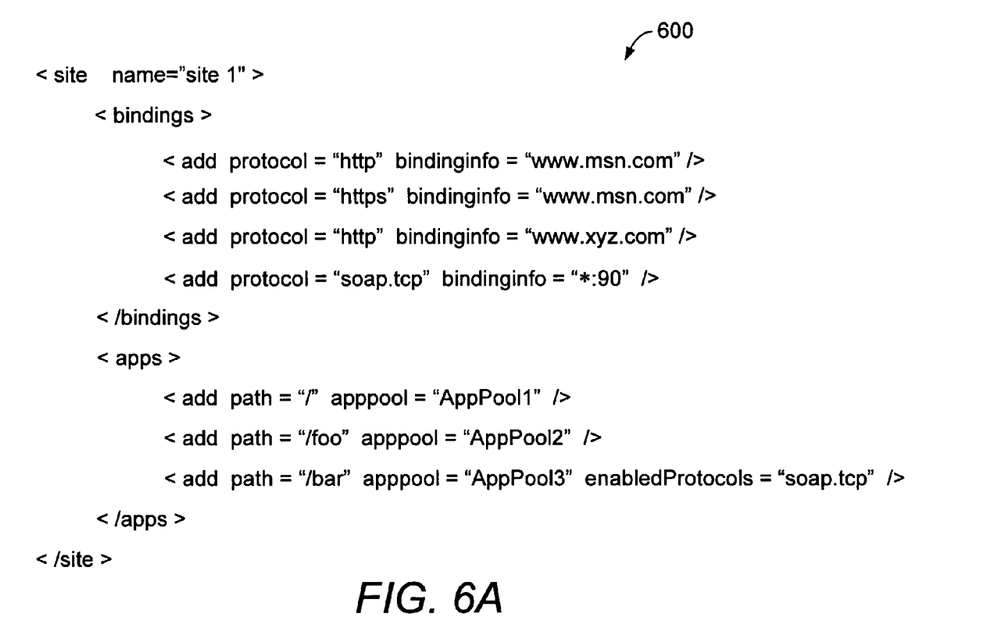
FIGS. 6A-6D are diagrams generally illustrating an association between applications and application pools, according to one embodiment.

FIG. 6A illustrates a portion of an extensible markup language (XML) document that defines a namespace 600 that associates applications with application pools. In this embodiment, a URL in a request has a binding and an application. The binding includes a protocol (e.g., HTTP) and binding information (e.g., "www.msn.com"). An application is defined by a path (e.g., "/foo"), and is associated with an application pool (e.g., "AppPool1"). For example, as shown in FIG. 6A, the application "/" is mapped to application pool "AppPool1". For this example embodiment, these mappings are illustrated more clearly in FIGS. 6B-6D.

In the example illustrated by FIG. 6A, the binding information "*:90" associated with protocol soap.tcp indicates that the listener for the protocol soap.tcp should listen for all IP addresses on port 90. In addition, in this embodiment, the path "/bar" is mapped to application pool "AppPool3", which is enabled for protocol soap.tcp. In this embodiment, the default condition is that all of the protocols for the path are enabled, but when a protocol is specified as enabled, all other protocols are disabled.

In some embodiments, this XML document portion is stored in configuration store 112 (FIG. 1), which process manager 110 (FIG. 1) can process to provide information (e.g., endpoint information 202 in FIG. 2) to listeners 120(1)-120(M) (FIG. 1). In one embodiment, each listener's endpoint information includes all of the mappings defined in namespace 600. Each listener can be configured to listen on its endpoint information only for requests with bindings having the protocol that listener supports.

Figure 6B:
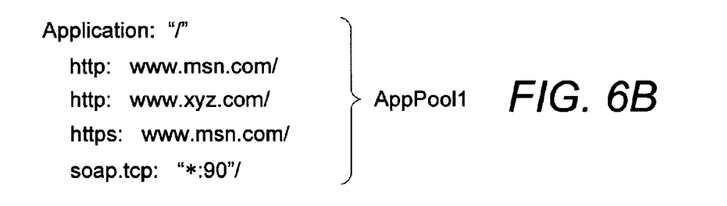
Figure 6C:
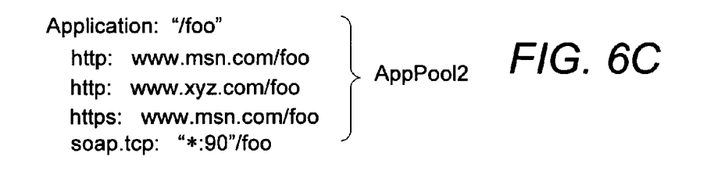
Figure 6D:
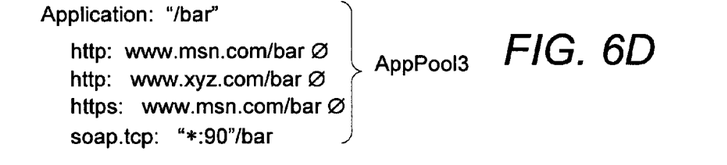

FIGS. 6B-6D illustrate the mapping of applications to the application pools defined by namespace 600 (FIG. 6A). In this example embodiment, the application "/" is mapped to application pool "AppPool1" (FIG. 6B); the application "/foo" is mapped to application pool "AppPool2" (FIG. 6C); and the application "/bar" is mapped to application pool "AppPool3" (FIG. 6D). FIGS. 6B-6C also show the bindings of each application that are defined in namespace 600. Although applications are mapped to application pools, the binding of a requested application may be disabled, as indicated by the "Ø" symbol in FIG. 6D for the binding "http://www.msn.com/bar".

Figure 7:
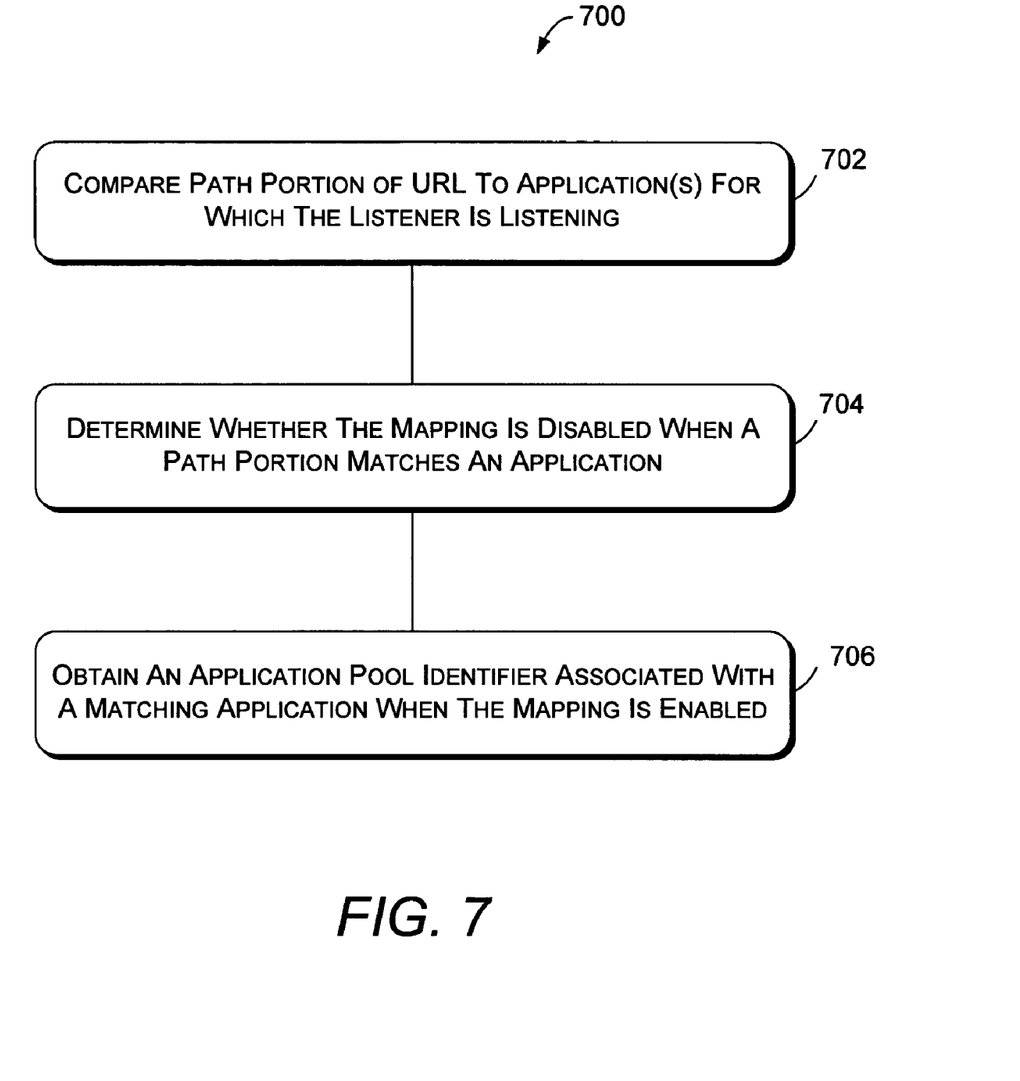
FIG. 7 is a flow diagram generally illustrating a process by which a listener can identify an application pool that is associated with a requested application, according to one embodiment.

FIG. 7 is a flow diagram generally illustrating a process 700 by which a listener can identify an application pool that is associated with a requested application, according to one embodiment. This process can be used to implement block 510 (FIG. 5) and block 402 (FIG. 4). For example, in one embodiment, listener 120(1) as depicted in FIG. 2 performs process 700 to identify an application pool that is associated with a requested application. However, different listener implementations can be used to perform the process in other embodiments.

At a block 702, the listener compares a path of the URL in the received request to application(s) identified in the information received in block 508 (FIG. 5). As previously described, in order for this request to be routed to this listener, the request must be formatted in the protocol supported by the listener. In an embodiment in which FIGS. 6B-6D identify the applications for which the listener is listening, the listener would compare the path of the URL to the applications of FIGS. 6B-6D to identify the application with the longest hierarchical matching path portion. For example, if the received request included the URL "www.msn.com/foo", the application with the longest hierarchical matching path would be that shown in FIG. 6C (i.e., application "/foo". In contrast, if the URL were "www.msn.com/foobar", the application with the longest matching path would be that shown in FIG. 6B (i.e., application "/") because "/foobar" matches neither "/foo" nor "/bar".

At a block 704, the listener determines whether the binding of the URL for the matching application is disabled. For example, in an embodiment having bindings for the application "/bar" as defined by FIG. 6D, for an HTTP request, the mapping of the binding "www.msn.com" is disabled. Thus, if the listener were configured to receive HTTP requests and received a request for "www.msn.com/bar", the listener would determine that the mapping is disabled and would return an error message, or ignore the request, or some other appropriate action.

At a block 706, the listener obtains the application pool identifier associated with the application if the mapping is not disabled. Continuing the example of block 702, the URL "www.msn.com/foo" matches the application "/foo" as shown in FIG. 6C, which is mapped to the application pool identified as "AppPool2". The listener can then use this application pool identifier in operation 310 (FIG. 3) to start a worker process to handle the request.

Although process 700 is illustrated and described sequentially, in other embodiments, the operations described in the blocks may be performed in different orders, multiple times, and/or in parallel.

Illustrative Operating Environment

The various embodiments described above may be implemented in computer environments of server 102 and clients 104(1)-104(N) of system 100 (FIG. 1). An example computer environment suitable for use in the server and/or clients is described below in conjunction with FIG. 8.

Figure 8:
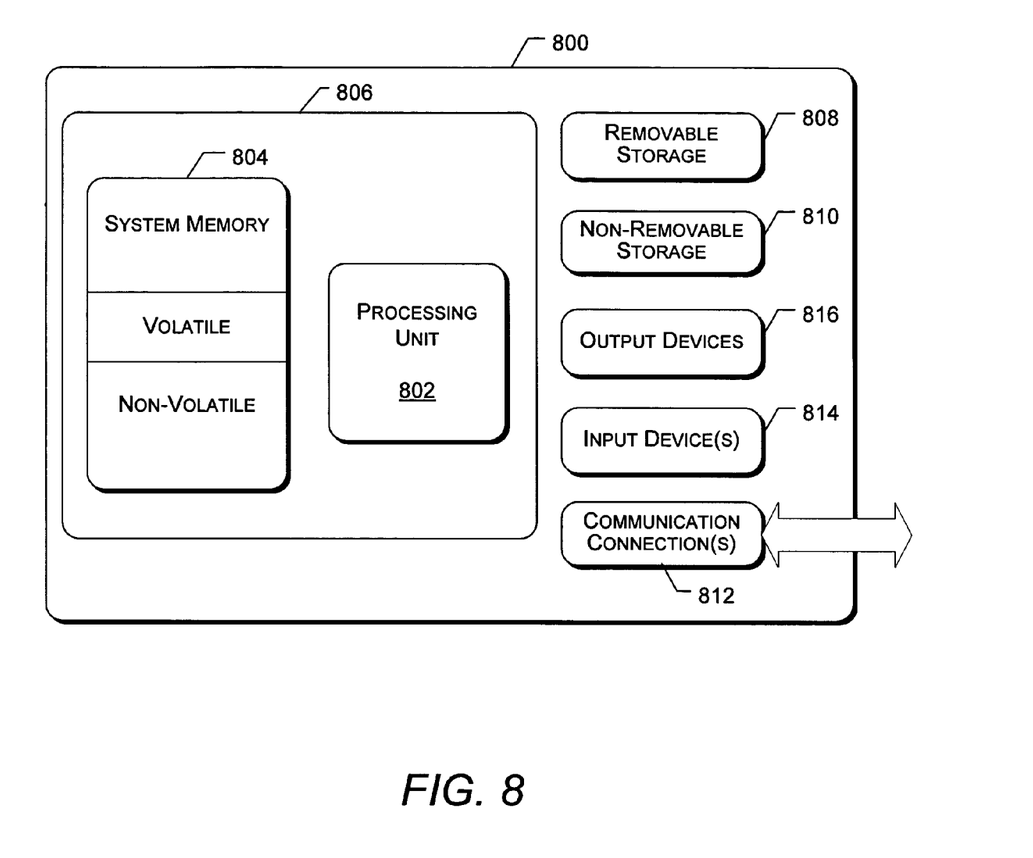
FIG. 8 is a functional block diagram generally showing an illustrative computing environment in which various embodiments of the techniques and mechanisms described herein may be implemented.

FIG. 8 illustrates an exemplary system for implementing embodiments of the invention. The environment includes a computing device, such as computing device 800. In a basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, computing device 800 may also have additional features/functionality. For example, computing device 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 800 may also have input device(s) 814 such as keyboard, mouse, pen, voice input device, touch input device, etc. Output device(s) 816 such as a display, speakers, printer, etc. may also be included. All these devices are well know in the art and need not be discussed at length here.

Computing device 800 may include a variety of computer readable media. Computer readable media can be any available media that can be accessed by computing device 800 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computing device 800. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method to form a connection between listeners and worker processes in a server, the server including a process manager, a first listener limited to supporting requests in a first protocol and a second listener limited to supporting requests in a second protocol, the method comprising:
   as part of functionality associated with the first listener,
      receiving information associating applications to application pools;
      receiving a request for an application, the request conforming to the first protocol;
      determining whether the requested application is one of the associated applications, the determining including comparing a path portion of the request to identifiers of the associated applications, the comparing including determining a longest hierarchical match between the path portion of the request and the identifiers of the associated applications;
      obtaining an application pool identifier of an application pool associated with the requested; and
      providing the application pool identifier to the process manager in starting a worker process to handle the request.

2. The method of claim 1, further comprising determining whether the requested application is disabled.

3. The method of claim 2, wherein determining whether the requested application is disabled comprises determining whether a binding portion of the request corresponds to an application that is specified as disabled in the information.

4. The method of claim 3, wherein the binding portion includes a protocol identifier.

5. The method of claim 1, further comprising ignoring the request for the application when the requested application is not one of the associated applications.

6. A server having computer storage medium storing a process manager, a first listener limited to support requests in a first protocol and a second listener limited to support requests in a second protocol, the first listener comprising:

means for receiving information associating applications to application pools;

means for receiving a request for an application, the request conforming to the first protocol;

means for determining whether the requested application is one of the associated applications, the determining including comparing a path portion of the request to identifiers of the associated applications, the comparing including determining a longest hierarchical match between the path portion of the request and the identifiers of the associated applications;

means for obtaining an application pool identifier of an application pool associated with the requested application; and means for providing the application pool identifier to the process manager in starting a worker process to handle the request.

7. The first listener of claim 6, further comprising means for determining whether the requested application is disabled.

8. The first listener of claim 7, wherein the means for determining whether the requested application is disabled further comprises means for determining whether a binding portion of the request corresponds to an application that is specified as disabled in the information.

9. The first listener of claim 8, wherein the binding portion includes a protocol identifier.

10. A system, comprising:

a plurality of clients;

a network coupled to the plurality of clients; and a server, coupled to the network, including a process manager, a configuration store, and a plurality of listeners to receive requests in a plurality of protocols, wherein each listener is configured to:

receive information associating applications to application pools;

receive a request for an application, the request conforming to one of the plurality of protocols;

determine whether the requested application is one of the applications;

compare a path portion of the request to identifiers of the associated applications;

determine a longest hierarchical match between the path portion of the request and the identifiers of the associated applications;

obtain an application pool identifier of an application pool associated with the requested application; and provide the application pool identifier to the process manager in starting a worker process to handle the request.

11. The system of claim 10, wherein each listener is further configured to determine whether the requested application is disabled.

12. The system of claim 11, wherein each listener is further configured to determine whether a binding portion of the request corresponds to an application that is specified as disabled in the information.

13. The system of claim 12, wherein the binding portion includes a protocol identifier.

14. The system of claim 10, wherein each listener is further configured to determine whether the requested application is disabled.

15. The method of claim 1, further comprising determining whether the requested application is disabled.

* * * * *

UNITED STATES PATENT AND TRADEMARK OFFICE
CERTIFICATE OF CORRECTION

| | | |
|---|---|---|
| PATENT NO. | : 7,418,709 B2 | Page 1 of 1 |
| APPLICATION NO. | : 10/931349 | |
| DATED | : August 26, 2008 | |
| INVENTOR(S) | : Emily Kruglick et al. | |

It is certified that error appears in the above-identified patent and that said Letters Patent is hereby corrected as shown below:

In column 12, line 49, in Claim 1, delete "requested;" and insert -- requested application; --, therefor.

Signed and Sealed this
Third Day of May, 2011

David J. Kappos
*Director of the United States Patent and Trademark Office*